(No Model.)

R. W. HENT.
ROLLER BEARING.

No. 389,653. Patented Sept. 18, 1888.

Witnesses:
Edward H. Blaney
Henry W. Bradley Jr.

Inventor:
Reuben W. Hent

N. PETERS, Photo-Lithographer, Washington, D. C.

UNITED STATES PATENT OFFICE.

REUBEN W. HENT, OF SAN FRANCISCO, CALIFORNIA.

ROLLER-BEARING.

SPECIFICATION forming part of Letters Patent No. 389,653, dated September 18, 1888.

Original application filed April 16, 1887, Serial No. 235,040. Divided and this application filed February 18, 1888. Serial No. 264,520. (No model.)

*To all whom it may concern:*

Be it known that I, REUBEN W. HENT, a citizen of the United States, residing in the city and county of San Francisco, and State of California, have invented a certain new and useful Improvement in Roller-Bearings, of which the following is a specification.

My invention is an improvement on my roller-bearing shown and described in my application for patent filed April 16, 1887, Serial No. 235,040, in which a ring bears at its periphery on journals of a series of bearing-rollers bearing directly on the shaft and casing, and at its inner side on journals of a series of separating-rollers bearing neither on the shaft nor casing, but on the bearing-rollers, keeping the latter separate from each other, and by such bearing kept from contact with the shaft. In said roller-bearing, after a little wear of the bearing-rollers, said journals of the separating-rollers are liable to shift from the ring.

The object of my improvement is to prevent said shifting. This object is attained by the addition of a smaller ring-bearing at its periphery on journals of the separating-rollers. In such additional ring and the peculiar construction and combinations of the parts hereinafter set forth consists, essentially, my improvement. It is illustrated in the accompanying drawings, in which—

Figure 1:
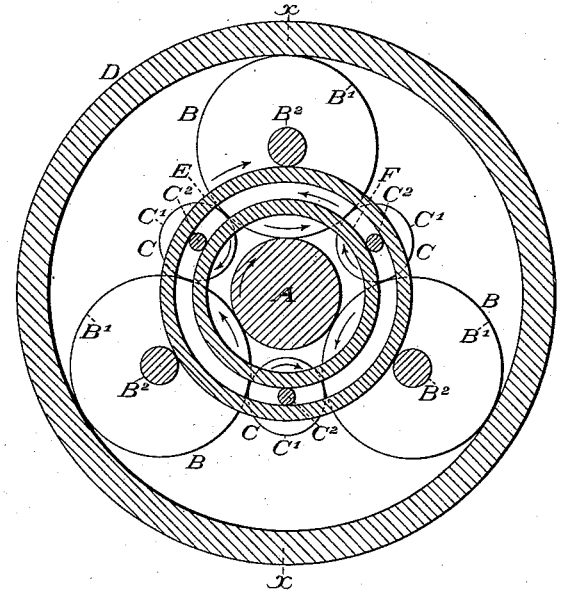
Figure 2:
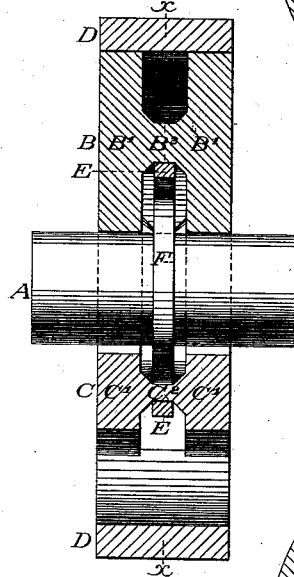
Figure 3:
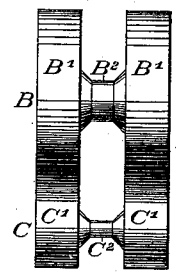
Figure 4:
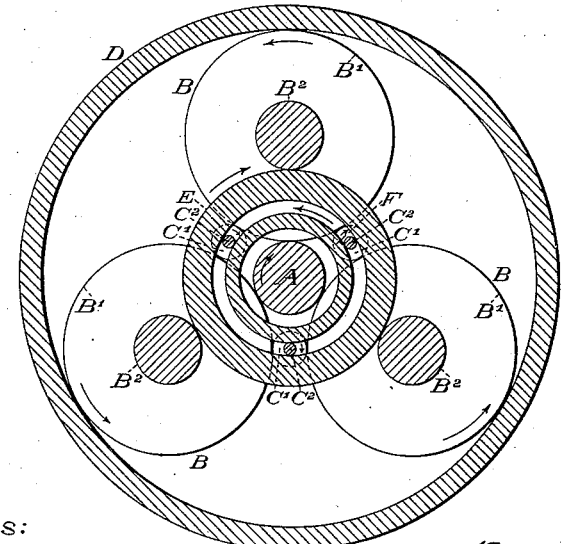
Figure 7:
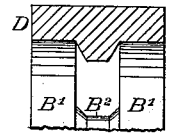
Figure 9:
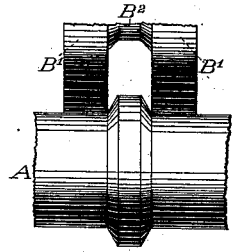
Figure 8:
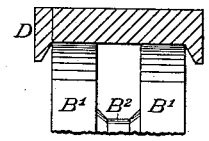
Figure 10:
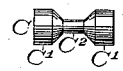

Figure 1 is a transverse section through the center or on the line $x$ $x$, Fig. 2, of a roller-bearing embodying my improvement. Fig. 2 is a longitudinal section through the center or on the line $x$ $x$, Fig. 1. Fig. 3 is a side view of a bearing-roller and a separating-roller, Fig. 1, showing the relative positions of the rollers as seen along the plane tangent to both. Fig. 4 is a transverse section through the center of my improved roller-bearing in which the axes of the separating-rollers are in the planes of the axes of the bearing-rollers. Figs. 5, 6, 7, 8, and 9 are views showing means of retaining the several parts, Fig. 1, in their proper longitudinal positions, Figs. 5 and 6 also showing separating-rollers reduced in weight. Fig. 10 is a side view of a short separating-roller, Fig. 4.

A represents the shaft; B, the bearing-rollers, as wholes; C, the separating-rollers, as wholes; D, the casing, and E and F the rings. The rings are hollow cylinders coaxial with the shaft and with each other and of different diameters, the ring F being the smaller.

Each bearing-roller B consists of two journals, B', bearing directly on the shaft and casing, and of a smaller journal, $B^2$, located between and coaxial with the journals B' and rotating in contact with the periphery of the ring E.

The separating-rollers C, keeping the rollers B separate from each other, consist each of two journals, C', bearing only on the journals B', each journal C' on and between two journals, B', and of a smaller journal, $C^2$, located between and coaxial with the journals C' and rotating between and in contact with the inner side of the ring E and the periphery of the ring F. The ring E is interposed between and bears on the journals $B^2$ at its periphery and the journals $C^2$ at its inner side. The smaller ring, F, bears at its periphery on the journals $C^2$, and, forming rolling bearings for these journals, keeps the latter in contact with the ring E and the rollers C from contact with the shaft independently of any bearing of the journals C' on the journals B', thus preserving the circularity and diameter of the orbit of the rollers C and its concentricity with the ring E whatever the wear of the journals B'.

The arrow-heads indicate the relative directions, when the casing is stationary, of the axial rotations of the shaft and rollers, and of the rings caused by the axial rotations of the journals $B^2$ and $C^2$.

Figure 5:
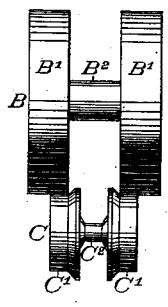
Figure 6:
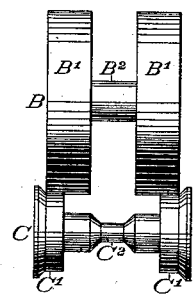

The ring F being rotated by the journals $C^2$ without sliding friction, receiving none of the pressure of the load, and being required only to resist the inward pressure of the journals $C^2$, which cannot exceed the weight of the rollers C, the ring and journals $C^2$ incur no substantial wear and retain substantially their original dimensions whatever the wear of the other parts. The employment of this ring permits the location of the axes of the rollers C in the planes of the axes of the rollers B, as shown in Fig. 4, or even still nearer to the shaft. By placing the axes of the rollers C in said planes and thus diminishing the necessary size (weight) and orbit (velocity) of these rollers, as well as by shortening the journals C', as shown in Figs. 5, 6, and 10, and making them hollow, (lighter,) their centrifugal force is greatly reduced, and all outward pressure of the journals $C^2$ on the ring E, arising from the pressure of the journals B' on the journals C', is avoided. If the velocity of the rollers C in their orbit is very great, their axes are preferably placed still a little nearer to the shaft, thus greatly relieving the journals $C^2$ and the ring E of the pressure of the centrifugal force of the journals C', which is then principally upon the journals B'. Such location, however, is attended with a slight inward pressure of the journals $C^2$ on the ring F, arising from the pressure of the journals B' on the journals C', unless counteracted by the centrifugal force of the journals C', and possibly also with some substantial wear of the latter unless made hollow to reduce their weight, (centrifugal force.) Obviously the centrifugal force of the rollers C may be great enough to keep the journals $C^2$ in contact with the ring E. Therefore, during the continuance of such force the ring F will have no function to perform.

The ring F is preferably of the same length as the ring E.

The journals C' may be much shorter than the journals B', as shown in Figs. 5, 6, and 10.

When the rollers C are retained in their proper longitudinal positions by the ring E, as shown in Figs. 2 and 3, the inner ends of both journals, B' and C', are preferably beveled to avoid sliding friction. If they are not so retained and the journals $B^2$ are a little longer than the journals $C^2$ or the rings, as shown in Figs. 5 and 6, then sliding friction may be avoided by beveling the inner ends of the journals C' only.

All the journals, B' and C', may be formed separate from and securely and rigidly attached to the journals $B^2$ and $C^2$; or all or any of them, (except of course the few necessarily removable to permit the insertion between the shaft and casing of the rollers and rings in their proper relative positions,) may be formed integral with the journals $B^2$ and $C^2$, respectively.

It is evident that instead of a single ring F bearing on the journals $C^2$, two rings F may bear on journals of the rollers C, located at the outer ends of the journals C', and that if journals $C^2$ and $B^2$ are located at the outer ends of the journals C' and B', instead of two rings F bearing on such journals $C^2$, a single ring F may bear on journals of the rollers C, located between the inner ends of the journals C'. Therefore I do not intend to limit my claims to one ring F, nor to any particular number of rings F, nor to any particular location longitudinally on the rollers C of the rings F and the journals on which they bear, nor to journals of the rollers C, rotating in contact with both the rings E and F.

I claim as my invention—

1. In a roller-bearing, the combination, with a series of bearing-rollers bearing directly on the shaft and casing, a series of separating-rollers bearing neither on the shaft nor casing, but on the bearing-rollers, and a ring bearing at its periphery on journals of the bearing-rollers and at its inner side on journals of the separating-rollers, of a smaller ring bearing at its periphery on journals of the separating-rollers, substantially as set forth.

2. In a roller-bearing, the combination, with the series of bearing-rollers B, consisting each of two journals, B', bearing directly on the shaft A and casing D, and of a journal, $B^2$, the series of separating-rollers C, consisting each of two journals, C', bearing only on the journals B', and of a journal, $C^2$, and the ring E, bearing at its periphery on the journals $B^2$, and at its inner side on the journals $C^2$ of the ring F, adapted to bear at its periphery on the journals $C^2$, substantially as shown and described, and for the purposes set forth.

3. In a roller-bearing, the combination of a series of bearing-rollers bearing directly on the shaft and casing and having journals adapted to rotate in contact with the periphery of a ring coaxial with the shaft, and a series of separating-rollers bearing neither on the shaft nor casing, but on the bearing-rollers, and having journals adapted to rotate in contact with the inner side of said ring and in contact with the periphery of a smaller ring, also coaxial with the shaft, all constructed and arranged substantially as set forth.

4. In a roller-bearing, the combination of the series of bearing-rollers B, consisting each of two journals, B', bearing directly on the shaft A and casing D, and of a journal, $B^2$, adapted to rotate in contact with the periphery of the ring E, coaxial with the shaft, and the series of separating-rollers C, consisting each of two journals, C', bearing only on the journals B', and of a journal, $C^2$, adapted to rotate between and in contact with the inner side of said ring E, and the periphery of the smaller ring, F, also coaxial with the shaft, all constructed and arranged substantially as shown and described, and for the purposes set forth.

5. In a roller-bearing, the combination, with two rings coaxial with the shaft and of different diameters, of a series of bearing-rollers bearing directly on the shaft and casing and having journals adapted to rotate in contact with the periphery of the larger of said rings, and a series of separating-rollers bearing neither on the shaft nor casing, but on the bearing-rollers, and keeping the latter separate from each other, and having journals adapted to rotate in contact with the inner side of said larger ring and in contact with the periphery of the smaller of said rings, all constructed and arranged substantially as and for the purposes set forth.

6. In a roller-bearing, the combination, with the rings E and F coaxial with the shaft A, of the series of bearing-rollers B, consisting each of two journals, B', bearing directly on the shaft and casing, and of a journal, $B^2$, located between the journals $B'$ and adapted to rotate in contact with the periphery of the ring E, and the series of separating-rollers C, keeping the rollers B separate from each other, and consisting each of two journals, $C'$, bearing only on the journals $B'$, each journal $C'$ on and between two journals, $B'$, and of a journal, $C^2$, located between the journals $C'$ and adapted to rotate between and in contact with the inner side of the ring E and the periphery of the ring F, all constructed and arranged substantially as shown and described, and for the purposes set forth.

7. In a roller-bearing, the combination, within the casing, of the shaft, two rings coaxial with the shaft and of different diameters, a series of bearing-rollers bearing directly on the shaft and casing and having journals adapted to rotate in contact with the periphery of the larger of said rings, and a series of separating-rollers bearing neither on the shaft nor casing, but on the bearing-rollers, and keeping the latter separate from each other, and having journals adapted to rotate in contact with the inner side of said larger ring and in contact with the periphery of the smaller of said rings, keeping the separating-rollers from contact with the shaft, all constructed, arranged, and operating substantially as and for the purposes set forth.

8. In a roller-bearing, the combination, within the casing D, of the shaft A, the series of bearing-rollers B, consisting each of two journals, $B'$, bearing directly on the shaft and casing, and a journal, $B^2$, located between the journals $B'$ and adapted to rotate in contact with the periphery of the ring E coaxial with the shaft, the series of separating-rollers C, keeping the rollers B separate from each other, and consisting each of two journals, $C'$ bearing only on the journals $B'$, each journal $C'$ on and between two journals, $B'$, and a journal, $C^2$, located between the journals $C'$ and adapted to rotate between and in contact with the inner side of said ring E, and the periphery of the ring F coaxial with the shaft, the said ring E adapted to bear at its periphery on the journals $B^2$ and at its inner side on the journals $C^2$, and the said ring F adapted to bear at its periphery on the journals $C^2$ and keeping the rollers C from contact with the shaft, all constructed, arranged, and operating substantially as shown and described, and for the purposes set forth.

9. A roller-bearing comprising the shaft A, the casing D, the series of bearing-rollers B, consisting each of two journals, $B'$ bearing directly on the shaft and casing, and a journal, $B^2$, located between the journals $B'$, and rotating in contact with the periphery of the ring E coaxial with the shaft, the series of separating-rollers C, consisting each of two journals, $C'$, bearing only on the journals $B'$, each journal $C'$ on and between two journals, $B'$, and a journal $C^2$, located between the journals $C'$ and rotating between and in contact with the inner side of said ring E and the periphery of the ring F coaxial with the shaft, the said ring E bearing at its periphery on the journals $B^2$ and at its inner side on the journals $C^2$, and the said ring F bearing at its periphery on the journals $C^2$, all constructed, arranged, combined, and adapted to operate substantially as shown and described, and for the purposes set forth.

REUBEN W. HENT.

Witnesses:
EDWARD WELLINGTON BLANEY,
HENRY WILLIAM BRADLEY, Jr.